United States Patent
Cullen et al.

(10) Patent No.: US 12,486,644 B2
(45) Date of Patent: Dec. 2, 2025

(54) YAW ESTIMATION SYSTEMS AND METHODS FOR RIGID BODIES OF EARTHMOVING MACHINES CONNECTED BY A REVOLUTE JOINT

(71) Applicant: Caterpillar Trimble Control Technologies LLC, Dayton, OH (US)

(72) Inventors: Shawn Cullen, Metamora, IL (US); Eric Dishman, Dunlap, IL (US); Wayne Lamb, Peoria, IL (US); Geoff Mills, Dunlap, IL (US); Yongliang Zhu, Dunlap, IL (US)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 421 days.

(21) Appl. No.: 17/880,872

(22) Filed: Aug. 4, 2022

(65) Prior Publication Data
US 2024/0044109 A1    Feb. 8, 2024

(51) Int. Cl.
*E02F 9/26* (2006.01)
*E02F 3/34* (2006.01)
(Continued)

(52) U.S. Cl.
CPC .............. *E02F 9/26* (2013.01); *E02F 9/2025* (2013.01); *E02F 9/24* (2013.01); *G01C 21/16* (2013.01); *E02F 3/34* (2013.01)

(58) Field of Classification Search
CPC ... E02F 9/26; E02F 9/2025; E02F 9/24; E02F 3/34; E02F 9/0841; G01C 21/16;
(Continued)

(56) References Cited

U.S. PATENT DOCUMENTS 8,689,471 B2    4/2014 Carpenter et al.
10,521,703 B2 * 12/2019 Beschorner .......... G01C 21/183
(Continued)

FOREIGN PATENT DOCUMENTS

EP    2949531 A2    12/2015
EP    2932194 B1    3/2019

OTHER PUBLICATIONS

International Search Report and Written Opinion, dated Nov. 6, 2023, received in corresponding PCT Application No. PCT/US2023/029406, pp. 1-15.

*Primary Examiner* — Scott A Browne
*Assistant Examiner* — Lidia Kwiatkowska
(74) *Attorney, Agent, or Firm* — Dinsmore & Shohl LLP (57) ABSTRACT

Yaw estimation systems and methods for an earthmoving machine and control architecture to receive roll and pitch input from an engine end frame (EEF) inertial motion unite (IMU) and from a non-engine end frame (NEEF) IMU, estimate a yaw articulation angle of the NEEF relative to the EEF by at least two different estimation methods based on the received roll and pitch input, fuse the at least two different estimation methods to generate an updated yaw articulation angle, calculate a yaw articulation rate based on the received roll and pitch input, integrate as an integration the updated yaw articulation angle and the yaw articulation rate, generate a real-time yaw articulation angle estimate of the NEEF relative to the EEF based on the integration, and operate the earthmoving machine based on the real-time yaw articulation angle estimate.

20 Claims, 5 Drawing Sheets

(51) Int. Cl.
  *E02F 9/20* (2006.01)
  *E02F 9/24* (2006.01)
  *G01C 21/16* (2006.01)

(58) Field of Classification Search
  CPC ......... B60W 2300/17; B60W 2300/50; B60W 2520/16; B60W 2520/18; B60W 2520/22; B60W 40/114
  See application file for complete search history.

(56) References Cited

U.S. PATENT DOCUMENTS

| | | |
|---|---|---|
| 2008/0000111 A1 | 1/2008 | Green |
| 2008/0047170 A1 | 2/2008 | Nichols |
| 2018/0372498 A1* | 12/2018 | Nackers ................. E02F 3/434 |
| 2019/0256102 A1 | 8/2019 | Schleicher |
| 2020/0081030 A1* | 3/2020 | Currier ............... G01P 15/0802 |
| 2021/0010245 A1* | 1/2021 | Graves ................. G05D 1/0278 |
| 2021/0026346 A1 | 1/2021 | Smith et al. |
| 2021/0215483 A1* | 7/2021 | Krone .................... G01S 19/14 |

* cited by examiner

YAW ESTIMATION SYSTEMS AND METHODS FOR RIGID BODIES OF EARTHMOVING MACHINES CONNECTED BY A REVOLUTE JOINT

BACKGROUND

The present disclosure relates to earthmoving machine including two rigid bodies connected by a revolute joint, such as wheel loaders, which, for the purposes of defining and describing the scope of the present application, comprise an engine end-frame and a non-engine end frame connected by the revolute joint. An earthmoving implement of the earthmoving machine may be used to move earth and other ground components with respect to the ground surface. For example, and not by way of limitation, many types of earthmoving machines comprise a hydraulically or pneumatically or electrically controlled earthmoving implements that can be manipulated by controlling functions of a linkage assembly of the earthmoving machine. Related technologies for other controlled earthmoving machine may include excavator technology that is, for example, well represented by the disclosures of U.S. Pat. No. 8,689,471, which is assigned to Caterpillar Trimble Control Technologies LLC and discloses methodology for sensor-based automatic control of an excavator, US 2008/0047170, which is assigned to Caterpillar Trimble Control Technologies LLC and discloses an excavator 3D laser system and radio positioning guidance system configured to guide a cutting edge of an excavator bucket with high vertical accuracy, and US 2008/0000111, which is assigned to Caterpillar Trimble Control Technologies LLC and discloses methodology for an excavator control system to determine an orientation of an excavator sitting on a sloped site.

BRIEF SUMMARY

According to the subject matter of the present disclosure, a yaw estimation system comprises an earthmoving machine. The earthmoving machine comprises a machine chassis comprising an engine end frame (EEF), an EEF inertial motion unit (IMU), a linkage assembly comprising a non-engine end frame (NEEF), a NEEF IMU, a revolute joint, an earthmoving implement, and control architecture. The EEF IMU is disposed on the EEF, the NEEF IMU is disposed on the NEEF, and the EEF is coupled to the NEEF via the revolute joint comprising a yaw axis longitudinally to allow for movement about the yaw axis in a single degree of freedom. The control architecture comprises an architecture controller programmed to receive roll and pitch input from the EEF IMU and from the NEEF IMU, estimate a yaw articulation angle of the NEEF relative to the EEF by at least two different estimation methods based on the received roll and pitch input, and fuse the at least two different estimation methods to generate an updated yaw articulation angle. The architecture controller is further programmed to calculate a yaw articulation rate based on the received roll and pitch input and integrate as an integration the updated yaw articulation angle and the yaw articulation rate. The architecture controller is further programmed to generate a real-time yaw articulation angle estimate of the NEEF relative to the EEF based on the integration and operate the earthmoving machine based on the real-time yaw articulation angle estimate.

In accordance with one embodiment of the present disclosure, a yaw estimation system comprises an earthmoving machine comprising a machine chassis comprising an engine end frame (EEF), an EEF inertial motion unit (IMU), a linkage assembly comprising a non-engine end frame (NEEF), a NEEF IMU, one or more other IMUs, a revolute joint, an earthmoving implement, and control architecture. The EEF IMU is disposed on the EEF, the NEEF IMU is disposed on the NEEF, and the EEF is coupled to the NEEF via the revolute joint comprising a yaw axis longitudinally to allow for movement about the yaw axis in a single degree of freedom. The EEF IMU and the NEEF IMU each comprise a 3-axis accelerometer and a 3-axis gyroscope. The control architecture comprises an architecture controller programmed to remove gravitational acceleration from data received from the EEF IMU, the NEEF IMU, and the one or more other IMUs of the earthmoving machine, receive roll and pitch input from the EEF IMU and from the NEEF IMU, estimate a yaw articulation angle of the NEEF relative to the EEF by at least two different estimation methods based on the received roll and pitch input, and fuse the at least two different estimation methods to generate an updated yaw articulation angle. The architecture controller is further programmed to calculate a yaw articulation rate based on the received roll and pitch input and integrate as an integration the updated yaw articulation angle and the yaw articulation rate. The architecture controller is further programmed to generate a real-time yaw articulation angle estimate of the NEEF relative to the EEF based on the integration and operate the earthmoving machine based on the real-time yaw articulation angle estimate.

In accordance with one other embodiment of the present disclosure, a method for use of yaw estimation system comprising an earthmoving machine is disclosed. The earthmoving machine comprises a machine chassis comprising an engine end frame (EEF), an EEF inertial motion unit (IMU), a linkage assembly comprising a non-engine end frame (NEEF), a NEEF IMU, a revolute joint, an earthmoving implement, and control architecture. The EEF IMU is disposed on the EEF, the NEEF IMU is disposed on the NEEF, and the EEF is coupled to the NEEF via the revolute joint comprising a yaw axis longitudinally to allow for movement about the yaw axis in a single degree of freedom. The method comprises receiving roll and pitch input from the EEF IMU and from the NEEF IMU, estimating via an architecture controller of the control architecture a yaw articulation angle of the NEEF relative to the EEF by at least two different estimation methods based on the received roll and pitch input, fusing the at least two different estimation methods to generate an updated yaw articulation angle, calculating a yaw articulation rate based on the received roll and pitch input, integrating as an integration the updated yaw articulation angle and the yaw articulation rate, generating via the architecture controller a real-time yaw articulation angle estimate of the NEEF relative to the EEF based on the integration, and operating via the control architecture the earthmoving machine based on the real-time yaw articulation angle estimate.

Figure 1:
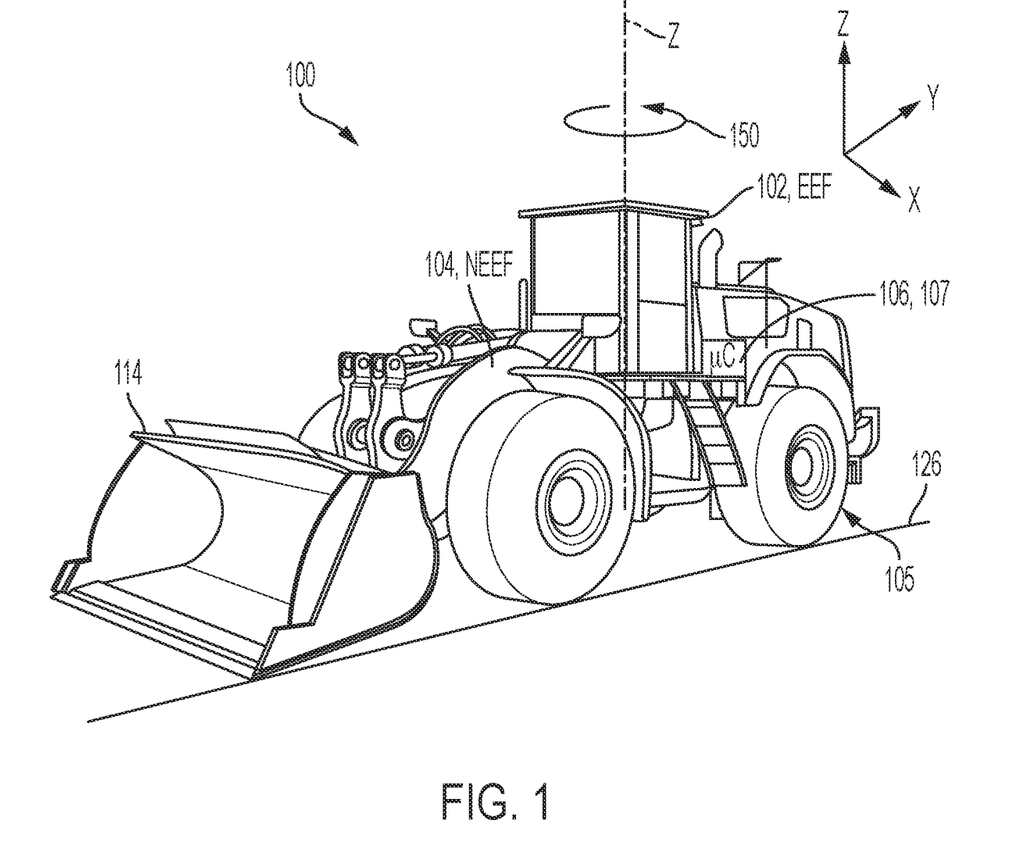
FIG. 1 is a side perspective view of an earthmoving machine that has two bodies connected by a revolute joint and that incorporates aspects of the present disclosure.

Although the concepts of the present disclosure are described herein with primary reference to the weight loader illustrated in FIG. 1, it is contemplated that the concepts will enjoy applicability to any type of weight loader, regardless of its particular mechanical configuration. For example, and not by way of limitation, the concepts may enjoy applicability to a backhoe loader including a backhoe linkage or to other types of earthmoving machines that include two rigid bodies connected by a revolute joint.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

The present disclosure relates to earthmoving machines and, more particularly, to earthmoving machines such as weight loaders to move and transfer earth and ground components and including components subject to control. For example, and not by way of limitation, many types of weight loaders typically have a hydraulically controlled earthmoving implement that can be manipulated by a joystick or other means in an operator control station of the machine, and is also subject to partially or fully automated control. The user of the machine may control the lift, tilt, angle, and pitch of the implement. In addition, one or more of these variables may also be subject to partially or fully automated control based on information sensed or received by an adaptive environmental sensor of the machine. In the embodiments described herein, a yaw estimation system for a earthmoving machine determines a value such as a real-time yaw articulation angle estimate of a first rigid body with respect to a second rigid body of the earthmoving bodies, the first and second rigid bodies connected by a vertical revolute joint, as described in greater detail further below. Such determined values may be utilized by an architecture control to operate the earthmoving machine.

Referring initially to FIG. 1, in embodiments, a yaw estimation system 107 includes an earthmoving machine 100. The earthmoving machine 100 includes a machine chassis 102, a linkage assembly 104, an earthmoving implement 114, and control architecture 106. The machine chassis 102 includes an engine end frame (EEF), and the linkage assembly 104 includes an non-engine end frame (NEEF). The earthmoving machine further includes a revolute joint 140 (FIG. 3), and the EEF of the machine chassis 102 is coupled to the NEEF of the linkage assembly 104 via the revolute joint 140 about a yaw axis that is aligned with a vertical z-axis of the revolute joint 140 longitudinally to allow for movement about the yaw axis in a single degree of freedom. For example, the NEEF can move about the yaw axis in a rotary direction, such as in a direction 150 of FIG. 1 or an opposing rotary direction. The earthmoving machine 100 further includes an EEF inertial motion unit (IMU) 160 (FIG. 3) disposed on the EEF and an NEEF IMU 170 (FIG. 3) disposed on the NEEF. The linkage assembly 104 is coupled to the earthmoving implement 114.

The control architecture 106 comprises one or more linkage assembly actuators and an architecture controller programmed to execute a control scheme 300 (FIG. 5) as described herein. In embodiments, the control architecture 106 comprises a non-transitory computer-readable storage medium comprising machine readable instructions. The one or more linkage assembly actuators may facilitate movement of the linkage assembly 104. The one or more linkage assembly actuators may comprise a hydraulic cylinder actuator, a pneumatic cylinder actuator, an electrical actuator, a mechanical actuator, or combinations thereof. The earthmoving machine 100 further includes a plurality of wheels 105 to move along a ground surface 126.

Figure 2:
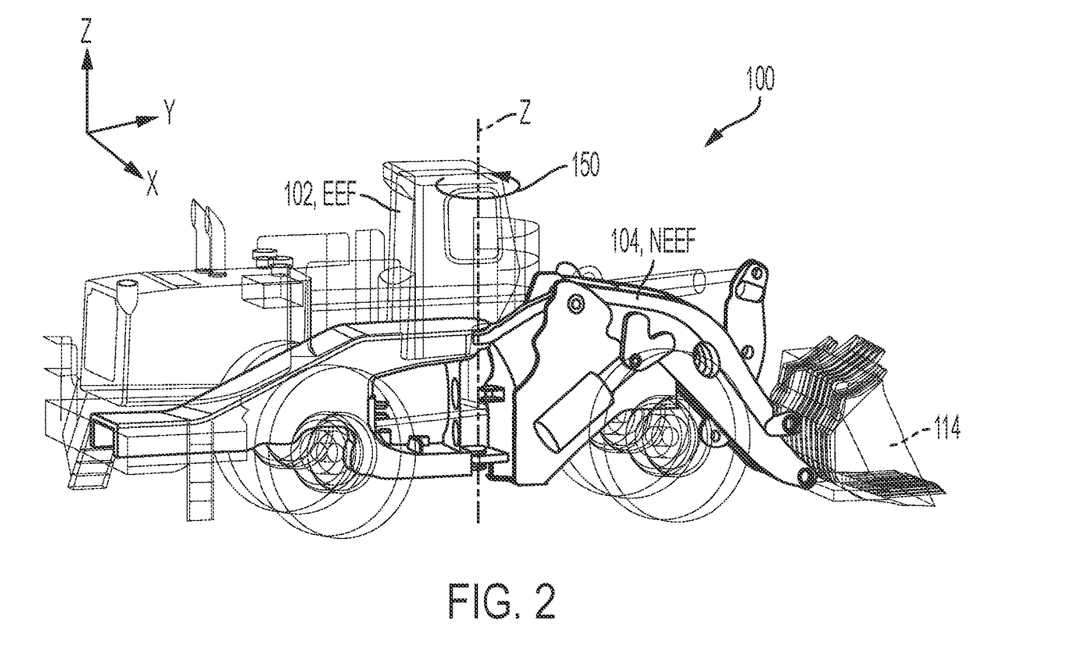
FIG. 2 is partially solid side view of the earthmoving machine of FIG. 1 showing the two bodies connected by the revolute joint having a vertical axis in solid detail, according to various concepts of the present disclosure.

FIG. 2 depicts for each of viewing a partially solid side view of the earthmoving machine of FIG. 1 showing frames of the two bodies EEF, NEEF (respectively associated with the machine chassis 102 and the linkage assembly 104) connected by the revolute joint (140, FIG. 3) in solid detail. The revolute joint connecting the two bodies EEF, NEEF has a vertical axis (z-axis, also referenced herein as the yaw axis).

Figure 3:
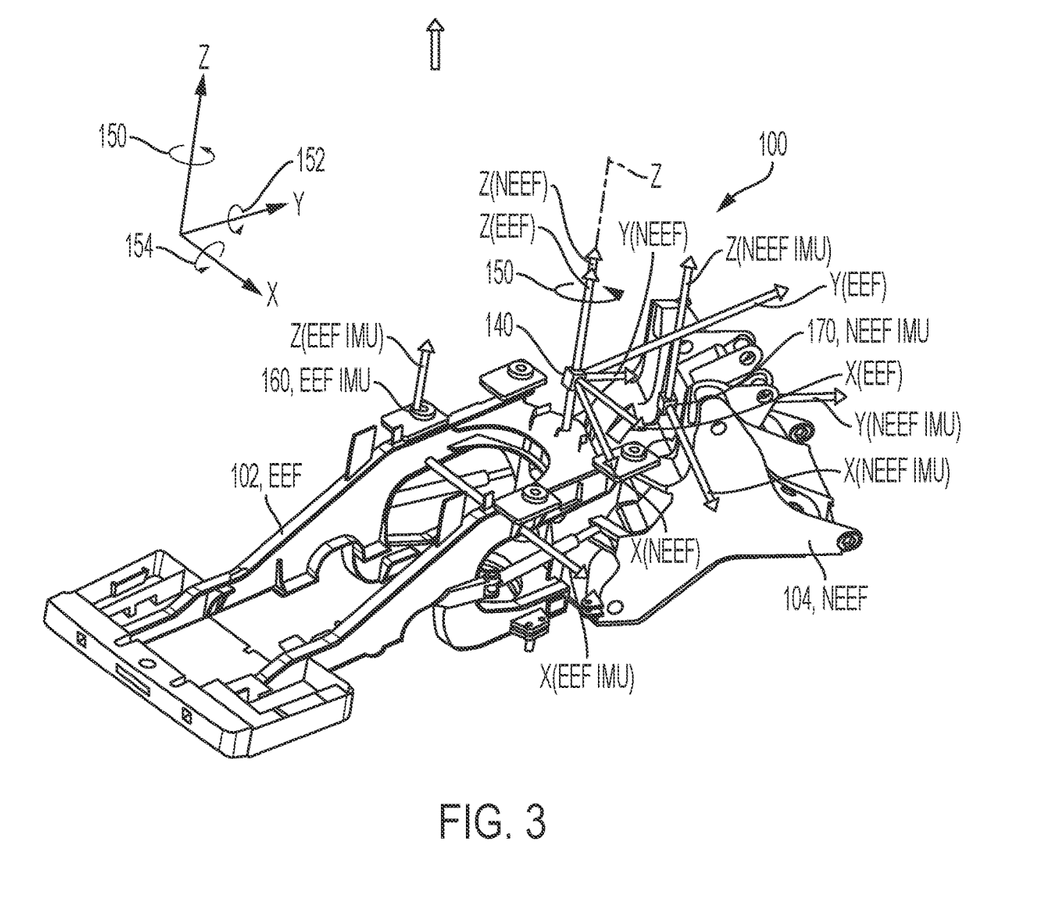
FIG. 3 is solid top side perspective view of the two bodies of FIG. 2 connected by the revolute joint having the vertical axis, according to various concepts of the present disclosure.

FIG. 3 is solid top side perspective view of the two bodies EEF, NEEF connected by the revolute joint 140 having the vertical z-axis (also aligned with Z(NEEF) and Z(EEF)). The EEF IMU 160 is disposed on the EEF associated with the machine chassis 102, and the NEEF IMU 170 is disposed on the NEEF associated with the linkage assembly 104. The EEF includes a z-axis as Z(EEF), an x-axis as X(EEF), and a y-axis as (YEEF) from an origin point of the revolute joint 140. The NEEF includes a z-axis as Z(NEEF), an x-axis as X(NEEF), and a y-axis as Y(NEEF) from an origin point of the revolute joint 140. The EEF IMU 160 is shown to include a z-axis as Z(EEF IMU) and an x-axis as X(EEF IMU). The NEEF IMU 170 is shown to include a z-axis as Z(NEEF IMU), an x-axis as X(NEEF IMU), and a y-axis as Y(NEEF IMU). Components as described herein may rotate with respect to z-axis, y-axis, and x-axis about a rotary axis such as in respective direction 150, 152, and 154 or in respective opposing rotary directions.

Figure 4:
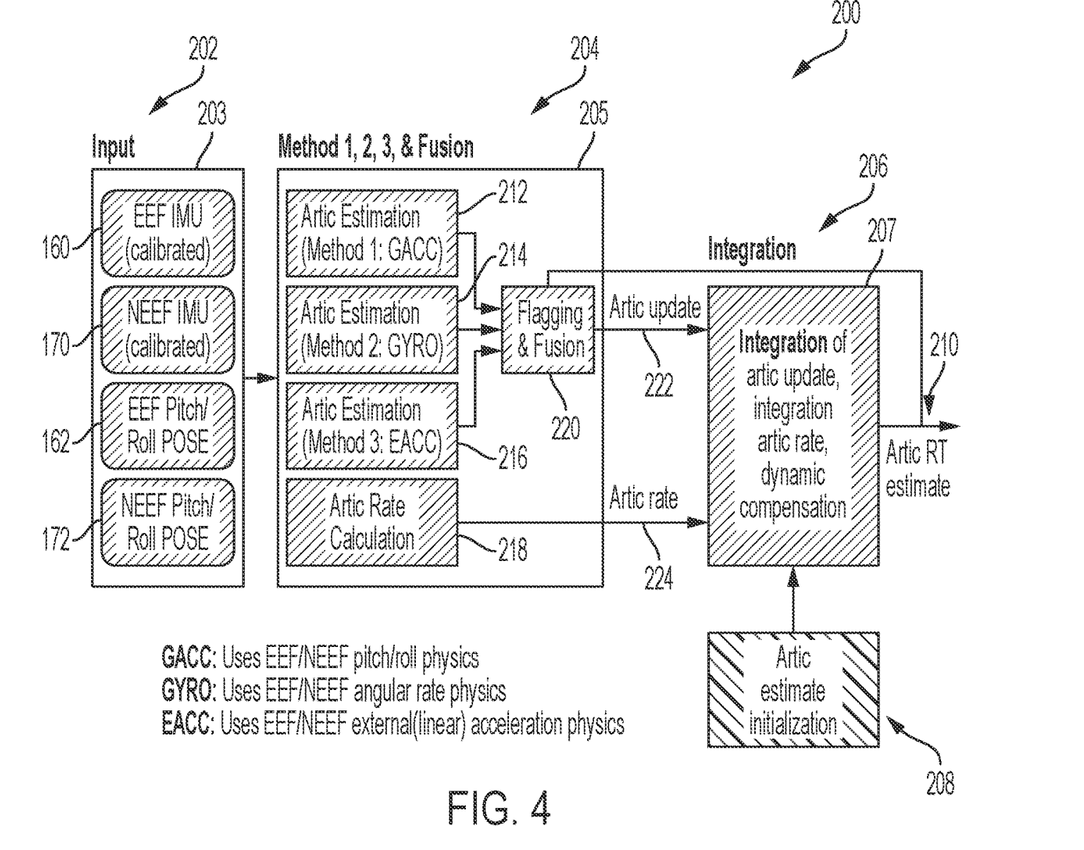
FIG. 4 is a schematic view of three different estimation methods to determine a yaw articulation angle estimation between the two rigid bodies of FIG. 3 about the vertical axis of the revolute joint, according to various concepts of the present disclosure.

FIG. 4 depicts a sub-system 200 of the yaw estimation system 107 including different estimation methods 204 to determine a yaw articulation angle estimation between the two rigid bodies NEEF, EEF of FIG. 3 about the vertical z-axis of the revolute joint 140. As will be described in greater detail further below, the different estimation methods 204 shown to estimate the yaw articulation angle estimation (e.g., also referenced in FIG. 4 as the "artic estimation") between the two rigid bodies NEEF, EEF include a gravitational acceleration (GACC) method 212 using roll and pitch physics, a gyroscope (GYRO) method 214 using angular rate physics, and an external acceleration (EACC) method 216. By way of example, and not as a limitation, the roll and pitch physics may each be inputs 202 among other inputs 202 received into an input module 203 from the EEF IMU 160 and the NEEF IMU 170, which may each be calibrated prior to providing respective inputs 202. For example, the inputs 202 may include EEF Pitch/Roll Pose (e.g., position and orientation) data 162 and NEEF Pitch/ Roll Pose data 172. Inputs 202 from the input module 203 are transmitted to an estimator module 205 that includes the different estimation methods 204. An articulation rate ("artic rate") 224 is calculated in a calculation module 218 of the estimator module 205. The yaw articulation angle estimations from the GACC method 212, the GYRO method 214, and the EACC method 216 are input into a fusion module 220 to generate an updated yaw articulation angle ("artic update") 222. In an embodiment, the artic update 222 may be integrated 206 to generate a real-time yaw articulation angle estimate ("artic RT estimate") 210. Additionally or alternatively, the artic update 222 and the artic rate 224 and other parameters such as a dynamic compensation along with an artic estimate initialization 208 parameters and processes may be input into an integration module 207 to generate the artic RT estimate 210.

Figure 5:
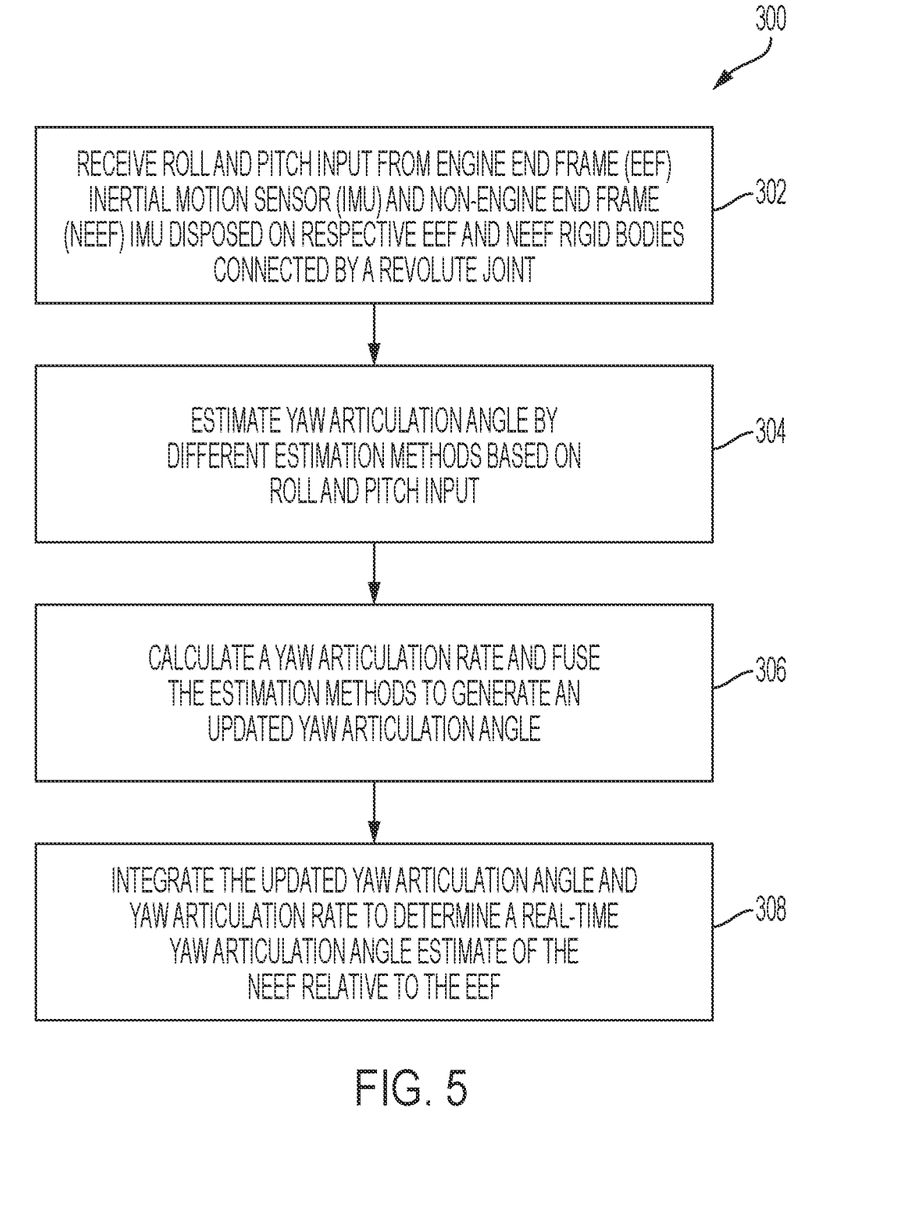
FIG. 5 is a flow chart of a process used to determine the yaw articulation angle estimation between the two rigid bodies of FIG. 3 about the vertical axis of the revolute joint, according to various concepts of the present disclosure.

Further, blocks 302-308 of the control scheme 300 of FIG. 5 illustrate the process the architecture controller as part of the sub-system 200 (FIG. 4) is programmed to execute. In block 302, the architecture controller may be programmed to receive roll and pitch input 202 (such as EEF Pitch/Roll Pose data 162 and NEEF Pitch/Roll Pose data 172) from the EEF IMU 160 and from the NEEF IMU 170. In embodiments, the received roll and pitch input 202 may be input into a low pass filter (LPF) as an LPF filter input, and an LPF phase lag may be estimated based on the LPF input. A dynamic compensation may be calculated due to the LPF phase lag. The integration may involve integration in the integration module 207 of the updated yaw articulation angle, the yaw articulation rate, and the dynamic compensation. Alternatively or additionally, dead reckoning data may be calculated for the earthmoving machine 100, and the integration may involve integration the updated yaw articulation angle, the yaw articulation rate, and the dead reckoning data.

In block 304, a yaw articulation angle of the NEEF relative to the EEF may be estimated by at least two different estimation methods based on the received roll and pitch input 202. As a non-limiting example, the at least two different estimation methods may include any two of the GACC method 212, the GYRO method 214, and the EACC method 216 of FIG. 4. Assumptions and terms for these methods 212, 214, 216 are set forth below.

In embodiments, the EEF IMU 160 and the NEEF IMU 170 each include a 3-axis accelerometer and a 3-axis gyroscope. Assumptions include that the EEF IMU 160 may be a six degrees of freedom IMU disposed on the EEF to provide three accelerations and three gyro rates. Further, the NEEF IMU 170 may be a six degrees of freedom IMU disposed on the NEEF to provide three accelerations and three gyro rates. The EEF and NEEF are connected via a vertical revolute joint 140 to provide relative yaw angle, and the EEF IMU 160 and NEEF IMU 170 are calibrated such that their frames are respectively aligned with EEF frame and NEEF frame. The origins of the EEF body frame and the NEEF body frame are located on the same point of EEF/NEEF vertical revolute joint 140, as shown in FIG. 3. The architecture controller may be programmed to calibrate the EEF IMU 160, wherein a frame of the EEF includes an EEF frame origin point corresponding to a point (e.g., an origin point) on the revolute joint 140, and calibrate the NEEF IMU 170, wherein a frame of the NEEF includes an NEEF frame origin point corresponding to the point on the revolute joint 140. Further, a frame of the calibrated EEF IMU may be aligned with an orientation of the frame of the EEF, and a frame of the calibrated NEEF IMU may be aligned with an orientation of the frame of the NEEF. In embodiments, gravitational acceleration may be removed from data received as input 202 from one or more IMUS of the earthmoving machine, including the EEF IMU 160 and the NEEF IMU 170.

The coordinate frame utilizes an x-axis in a right direction, a y-axis in a forward direction, and a z-axis in an upwards vertical direction, where angle and angular rates follow a right hand rule approach. A global coordinate frame (e.g., global frame) of the earthmoving machine 100 may also be referenced as a navigation frame NV. In the mathematics of the methods discussed below, the EEF coordinate frame is referenced as EEF, the NEEF coordinate frame is referenced as NEEF, the EEF IMU coordinate frame is referenced as EIMU, and the NEEF IMU coordinate frame is reference das NIMU. Due north is considered from a 0 yaw origin point, and a Euler angles order includes yaw (about a z-axis), pitch (about an x-axis), then roll (about a y-axis) from the navigation frame NV to the body frame. Parameter terms for these methods 212, 214, 216 are set forth in TABLE 1 below.

TABLE 1

| PARAMETER | DESCRIPTION |
|---|---|
| $T_{x,EEF}^{NV}/T_{y,EEF}^{NV}/T_{z,EEF}^{NV}$ | EEF Euler pitch/roll/yaw angle in Navigation frame |
| $T_{x,NEEF}^{NV}/T_{y,NEEF}^{NV}/T_{z,NEEF}^{NV}$ | NEEF Euler pitch/roll/yaw angle in Navigation frame |
| $T_{x,NEEF}^{EEF}/T_{y,NEEF}^{EEF}/T_{z,NEEF}^{EEF}$ | NEEF Euler pitch angle in EEF frame |
| $T_{EEFnNEEF} = T_{z,NEEF}^{NV} - T_{z,EEF}^{NV}$ | relative yaw articulation angle of the NEEF and the EEF in the global frame indicative of an EEF and NEEF yaw angle difference |
| $\omega_{x,EIMU}/\omega_{y,EIMU}/\omega_{z,EIMU}$ | EEF IMU pitch/roll/yaw rate in EEF IMU frame |
| $\Omega_{EIMU} = (\omega_{x,EIMU}\ \omega_{y,EIMU}\ \omega_{z,EIMU})^T$ | EEF IMU angular rate vector in EEF IMU frame |
| $\omega_{x,EEF}/\omega_{y,EEF}/\omega_{z,EEF}$ | EEF pitch/roll/yaw rate in EEF frame |
| $\Omega_{EEF} = (\omega_{x,EEF}\ \omega_{y,EEF}\ \omega_{z,EEF})^T$ | EEF angular rate vector in EEF frame |
| $\omega_{x,NIMU}/\omega_{y,NIMU}/\omega_{z,NIMU}$ | NEEF IMU pitch/roll/yaw rate in NEEF IMU frame |
| $\Omega_{NIMU} = (\omega_{x,NIMU}\ \omega_{y,NIMU}\ \omega_{z,NIMU})^T$ | NEEF IMU angular rate vector in NEEF IMU frame |
| $\omega_{x,NEEF}/\omega_{y,NEEF}/\omega_{z,NEEF}$ | NEEF pitch/roll/yaw rate in NEEF frame |
| $\Omega_{NEEF} = (\omega_{xNEEF}\ \omega_{y,NEEF}\ \omega_{z,NEEF})^T$ | NEEF angular rate vector in NEEF frame |
| $a_{x,EIMU}/a_{y,EIMU}/a_{z,EIMU}$ | EEF IMU x/y/z-acceleration in EEF IMU frame |
| $A_{EIMU} = (a_{x,EIMU}\ a_{y,EIMU}\ a_{z,EIMU})^T$ | EEF IMU acceleration vector in EEF IMU frame |
| $a_{x,EEF}/a_{y,EEF}/a_{z,EEF}$ | EEF original x/y/z-acceleration in EEF frame |
| $A_{EEF} = (a_{x,EEF}\ a_{y,EEF}\ a_{z,EEF})^T$ | EEF original acceleration vector in EEF frame |
| $a_{x,NEEF}/a_{y,NEEF}/a_{z,NEEF}$ | NEEF original x/y/z-acceleration in NEEF frame |
| $A_{NEEF} = (a_{x,NEEF}\ a_{y,NEEF}\ a_{z,NEEF})^T$ | NEEF original acceleration vector in NEEF frame |
| $\omega_{x,NEEF}^{EEF}/\omega_{y,NEEF}^{EEF}/\omega_{z,NEEF}^{EEF}$ | NEEF pitch/roll/yaw rate in EEF frame |
| $\Omega_{NEEF}^{EEF} = (\omega_{xNEEF}^{EEF}\ \omega_{y,NEEF}^{EEF}\ \omega_{z,NEEF}^{EEF})^T$ | NEEF gyro rate vector in EEF frame |
| $X_{EIMU}^{EEF}$ | EEF IMU position vector in EEF frame |
| $X_{NIMU}^{NEEF}$ | NEEF IMU position vector in NEEF frame |
| $A_{EEF}^{NV}/A_{NEEF}^{NV}$ | EEF/NEEF original acceleration in Navigation frame. By assumption, $A_{EEF}^{NV} = A_{NEEF}^{NV}$ |
| $R_x(*)$ | Rotation matrix around x-axis |
| $R_y(*)$ | Rotation matrix around y-axis |
| $R_z(*)$ | Rotation matrix around z-axis |

TABLE 1-continued

| PARAMETER | DESCRIPTION |
| --- | --- |
| $R_{F1}{}^{F2}$ | Rotation matrix of F1 in F2 frame, F1/F2 could be NV(Navigation frame), EEF(EEF frame), NEEF(NEEF frame), EIMU(EEF IMU frame), NIMU(NEEF IMU frame) |
| $\dot{R}$ | Time derivative of R |
| $R^T$ | Transpose of matrix R |
| $R^{-1}$ | Inverse of matrix R |
| S(.) | Skew-symmetric matrix of a vector. $$S([x, y, z]^T) = \begin{bmatrix} 0 & -z & y \\ z & 0 & -x \\ -y & x & 0 \end{bmatrix}$$ |

The following are rotation matrix equations using one or more terms of TABLE 1, with $T_{z,EEF}{}^{NV}$ being an unknown parameter for which to solve based on received roll and pitch inputs 202.

$$R_{EIMU}{}^{NV} = R_{EEF}{}^{NV} = R_z(T_{z,EEF}{}^{NV})R_y(T_{y,EEF}{}^{NV})R_x(T_{x,EEF}{}^{NV}) \quad \text{(Equation 1)}$$

$$R_{NEEF}{}^{EEF} = R_z(T_{z,NEEF}{}^{EEF}) \quad \text{(Equation 2)}$$

$$R_{NIMU}{}^{NV} = R_{NEEF}{}^{NV} = R_{EEF}{}^{NV} R_{NEEF}{}^{EEF} \quad \text{(Equation 3)}$$

$$\dot{R}_{NEEF}{}^{NV} = S(\Omega_{NEEF}{}^{NV}) R_{NEEF}{}^{NV} \quad \text{(Equation 4)}$$

$$R_{NIMU}{}^{NV} = R_{NEEF}{}^{NV} = R_z(T_{z,NEEF}{}^{NV})R_y(T_{y,NEEF}{}^{NV})R_x(T_{x,NEEF}{}^{NV}) \quad \text{(Equation 5)}$$

GACC Method

The GACC method 212 may use data associated with the earthmoving machine 100 when on a slope and static (e.g., not moving) to determine a gravitational acceleration relationship between the EEF and the NEEF. To execute the GACC method, the architecture controller may be configured to equate in a GACC equation (as shown in Equation 6 below, which is associated with Equation 3 above) a rotational matrix of the NEEF relative to a global frame to a rotational matrix of the EEF relative to the global frame multiplied by a rotational matrix of the NEEF relative to the EEF.

$$R_{NEEF}{}^{NV} = R_{EEF}{}^{NV} R_{NEEF}{}^{EEF} \quad \text{(Equation 6)}$$

The GACC equation may be manipulated based on unknown parameters comprising a yaw articulation angle of the NEEF relative to the global frame $T_{z,NEEF}{}^{NV}$, a yaw articulation angle of the EEF relative to the global frame $T_{z,EEF}{}^{NV}$, and a rotational matrix around the yaw axis of the NEEF relative to the EEF $R_{z,NEEF}{}^{EEF}$ as shown in Equation 7 below.

$$R_z(T_{z,NEEF}{}^{NV})R_y(T_{y,NEEF}{}^{NV})R_x(T_{x,NEEF}{}^{NV}) = R_z(T_{z,EEF}{}^{NV})R_y(T_{y,EEF}{}^{NV})R_x(T_{x,EEF}{}^{NV})R_{z,NEEF}{}^{EEF} \quad \text{(Equation 7)}$$

Such manipulation result in a further GACC equation listing the yaw articulation angle of the NEEF relative to the EEF $T_{z,NEEF}{}^{EEF}$ as an unknown parameter. Rotation matrices associated with a pitch articulation angle and a roll articulation angle based on the received roll and pitch input 202 about each of the yaw axis, a pitch axis, and a roll axis may be input parameters. To manipulate Equation 7 to result in the further GACC equation, understanding $T_{z,EEFnNEEF} = T_{z,NEEF}{}^{NV} - T_{z,EEF}{}^{NV}$, Equation 8 below results with unknown parameters $T_{z,EEFnNEEF}$ and $R_{z,NEEF}{}^{EEF}$.

$$R_z(T_{z,EEFnNEEF})R_y(T_{y,NEEF}{}^{NV})R_x(T_{x,NEEF}{}^{NV}) = R_{y,EEF}{}^{NV} R_{x,EEF}{}^{NV} R_{z,NEEF}{}^{EEF} \quad \text{(Equation 8)}$$

Expanding Equation 8 results in Equation 9 below.

$$\begin{bmatrix} * & * & * \\ * & * & * \\ m_{31} & m_{32} & * \end{bmatrix} = 0 \quad \text{(Equation 9)}$$

Hence the yaw articulation angle (e.g., the articulation angle $T_{z,NEEF}{}^{EEF}$ could be solved for as an unknown parameter from the following Equations 10-12, Equation 12 being representative of the further GACC equation.

$$m_{31} = \cos(T_{z,NEEF}{}^{EEF})\sin(T_{y,EEF}{}^{NV}) - \sin(T_{y,NEEF}{}^{NV}) - \cos(T_{y,EEF}{}^{NV})\sin(T_{x,EEF}{}^{NV})\sin(T_{z,NEEF}{}^{EEF}) = 0$$

$$m_{32} = \cos(T_{y,NEEF}{}^{NV})\sin(T_{x,NEEF}{}^{NV}) - \sin(T_{y,EEF}{}^{NV})\sin(T_{z,NEEF}{}^{EEF}) - \cos(T_{y,EEF}{}^{NV})\cos(T_{z,NEEF}{}^{EEF})\sin(T_{x,EEF}{}^{NV}) = 0 \quad \text{(Equation 10)}$$

Equation 10 may be manipulated to arrive at Equation 11.

$$\underbrace{\begin{pmatrix} -\cos(T_{y,EEF}^{NV})\sin(T_{x,EEF}^{NV}) & \sin(T_{y,EEF}^{NV}) \\ -\sin(T_{y,EEF}^{NV}) & -\cos(T_{y,EEF}^{NV})\sin(T_{x,EEF}^{NV}) \end{pmatrix}}_{A} \underbrace{\begin{pmatrix} \sin(T_{z,NEEF}^{EEF}) \\ \cos(T_{z,NEEF}^{EEF}) \end{pmatrix}}_{X} = \underbrace{\begin{pmatrix} \sin(T_{y,NEEF}^{NV}) \\ -\cos(T_{y,NEEF}^{NV})\sin(T_{z,NEEF}^{NV}) \end{pmatrix}}_{B} \quad \text{(Equation 11)}$$

Thus, with the parameter matrices A, X, and B set forth above, Equation 11 becomes Equation 12 below, representative of the further GACC equation to use to solve for the yaw articulation angle (e.g., the articulation angle $T_{z,NEEF}{}^{EEF}$. Hence, the yaw articulation angle of the NEEF relative to the EEF $T_{z,NEEF}{}^{EEF}$ may be solved for based on the further GACC equation.

$$X = \begin{pmatrix} x_1 \\ x_2 \end{pmatrix} = A^{-1}B, \quad T_{z,NEEF}^{EEF} = \arctan\left(\frac{x_1}{x_2}\right) \quad \text{(Equation 12)}$$

GYRO Method

The GYRO method 214 may use the received roll and pitch data as inputs 202 associated with the earthmoving machine 100 to determine an angular relationship (e.g., based on angular dynamic movement) between the EEF and the NEEF. To execute the GYRO method 214, the architecture controller may be configured to, as shown in Equation 6 above, equate in the GACC equation the rotational matrix of the NEEF relative to a global frame to the rotational matrix of the EEF relative to the global frame multiplied by the rotational matrix of the NEEF relative to the EEF. As shown in Equation 13 below, a time derivative of the GACC equation (e.g., Equation 6) using associated angular rate vectors in corresponding frames for each parameter may be generated.

$$S(\Omega_{NEEF}^{NV})R_{NEEF}^{NV}=S(\Omega_{NEEF}^{NV})R_{EEF}^{NV}R_{NEEF}^{EEF}+R_{EEF}^{NV}S(\Omega_{NEEF}^{EEF})R_{NEEF}^{EEF} \quad \text{(Equation 13)}$$

Equation 13 may be simplified via Equations 14-19 below to generate a further GYRO equation (Equation 20 below) to solve for an unknown parameters of (i) a relative yaw articulation angle of the NEEF and the EEF in the global frame indicative of an EEF and NEEF yaw angle difference and (ii) a relative yaw rate between the NEEF and the EEF, and the yaw articulation angle of the NEEF relative to the EEF $T_{z,NEEF}^{EEF}$ based on the further GYRO equation of Equation 20. Simplification of Equation 13 results in Equations 14 and 15 below.

$$S(\Omega_{NEEF}^{NV})-S(\Omega_{EEF}^{NV})=R_{EEF}^{NV}S(\Omega_{NEEF}^{EEF}) \quad \text{(Equation 14)}$$
$$R_{EEF}^{NV^T}$$

$$S(\Omega_{NEEF}^{EEF})=R_{EEF}^{NV^T}(S(\Omega_{NEEF}^{NV})-S(\Omega_{EEF}^{NV})) \quad \text{(Equation 15)}$$
$$R_{EEF}^{NV}$$

From Equations 14 and 15, the following is noticed as Equation 16, with the relative yaw rate between EEF and NEEF $\omega_{z,NEEF}^{EEF}$ an unknown parameter:

$$\Omega_{NEEF}^{NV}=R_{NEEF}^{NV}\Omega_{NIMU}, \quad \text{(Equation 16)}$$

$$\Omega_{EEF}^{NV}=R_{EEF}^{NV}\Omega_{EIMU}, \Omega_{NEEF}^{EEF}=\begin{bmatrix}0\\0\\\omega_{z,NEEF}^{EEF}\end{bmatrix}$$

Using Equations 14-16, the unknown parameters for the NEEF yaw angle $T_{z,NEEF}$ and the relative yaw rate between EEF and NEEF $\omega_{z,NEEF}^{EEF}$ may be solved for, and Equation 15 may be rewritten as Equation 17 below.

$$S(\Omega_{NEEF}^{EEF})+S(\Omega_{EIMU})=S(R_{yx,EEF}^T R_{z,EEFnNEEF} R_{yx,NEEF}\Omega_{NIMU}) \quad \text{(Equation 17)}$$

where $$R_{z,EEFnNEEF}=R_z(T_{z,EEFnNEEF}), R_{yx,EEF}=R_y(T_{y,EEF}^{NV})R_x(T_{x,EEF}^{NV}), R_{yx,NEEF}$$
$$=R_y(T_{y,NEEF}^{NV})R_x(T_{x,NEEF}^{NV})$$

Via denoting $\Omega_1=[x_1,y_1,z_1]^T=R_{yx,NEEF}\Omega_{NIMU}$ and expansion of Equation 17, Equations 18-19 below results.

$$\begin{pmatrix}f_1\\f_2\\f_3\end{pmatrix}=\begin{pmatrix}0\\0\\0\end{pmatrix} \quad \text{(Equation 18)}$$

$$f_1= \quad \text{(Equation 19)}$$

$\omega_{x,EIMU}+z_1\sin(T_{y,EEF})-x_1\cos(T_{y,EEF})\cos(T_{z,EEFnNEEF})+$ $y_1\cos(T_{y,EEF})\sin(T_{s,EEFnNEEF})$ $f_2=\omega_{y,EIMU}-x_1(\cos(T_{x,EEF})\sin(T_{z,EEFnNEEF})+$ $\sin(T_{x,EEF})\sin(T_{y,EEF})\cos(T_{z,EEFnNEEF}))-$ $y_1(\cos(T_{x,EEF})\cos(T_{x,EEFnNEEF})-\sin(T_{x,EEF})$ $\sin(T_{y,EEF})\sin(T_{z,EEFnNEEF}))-z_1\cos(T_{y,EEF})\sin(T_{x,EEF})$ -continued
$f_3=\omega_{z,EIMU}+\omega_{z,NEEF}^{EEF}+x_1(\sin(T_{x,EEF})\sin(T_{z,EEFnNEEF})-$ $\cos(T_{x,EEF})\sin(T_{y,EEF})\cos(T_{z,EEFnNEEF}))+$ $y_1(\sin(T_{x,EEF})\cos(T_{z,EEFnNEEF})+\cos(T_{x,EEF})\sin(T_{y,EEF})$ $\sin(T_{z,EEFnNEEF}))-z_1\cos(T_{x,EEF})\cos(T_{y,EEF})$ Unknown parameter of the relative yaw rate between EEF and NEEF, $\omega_{z,NEEF}^{EEF}$, and the relative yaw in global frame $T_{z,EEFnNEEF}$ could be solved from the above Equation 19 via manipulation into Equation 20 below.

$$R_{NEEF}^{EEF}=R_{yx,EEF}^T R_z(T_{z,EEFnNEEF})R_{yx,NEEF} \quad \text{(Equation 20)}$$

Thus, the relative pitch, roll and yaw angle between EEF and NEEF including the yaw articulation angle of the NEEF relative to the EEF $T_{z,NEEF}^{EEF}$ could be found from $R_{NEEF}^{EEF}$ in Equation 20 by Equation 21 below.

$$R_{NEEF}^{EEF}=R_z(T_{z,NEEF}^{EEF})R_y(T_{y,NEEF}^{EEF})R_x \\ (T_{x,NEEF}^{EEF}) \quad \text{(Equation 21)}$$

EACC Method

The EACC method 216 may use external and linear acceleration physics associated with at least speeding, curving, or combinations thereof of the earthmoving machine 100 to determine an external linear acceleration relationship (e.g., based on linear dynamic movement) between the EEF IMU and the NEEF IMU. To execute the EACC method, the architecture controller is configured to equate in an EACC equation a rotational matrix of the EEF in a global frame multiplied by an EEF IMU original linear acceleration to the EEF original linear acceleration in the global frame plus the rotational matrix of the EEF in the global frame multiplied against associated skewed symmetric matrices of an NEEF angular rate vector in an NEEF frame and a time derivative thereof, and against an NEEF IMU position vector in the NEEF frame as shown in Equation 22 below. Given EEF and NEEF original linear acceleration, $A_{EEF}^{NV}$ and $A_{NEEF}^{NV}$, the EEF IMU and NEEF IMU frame original linear acceleration, $A_{EIMU}$ and $A_{NIMU}$ satisfy Equation 22 below. Further, it is assumed via an assumption that the EEF original acceleration in the global frame equals the NEEF original acceleration in the global frame in Equation 22.

$$R_{EEF}^{NV}A_{EIMU}=A_{EEF}^{NV}+R_{EEF}^{NV}(S(\dot{\Omega}_{EEF})+S(\Omega_{EEF})S \\ (\Omega_{EEF}))X_{EIMU}^{EEF}$$

$$R_{NEEF}^{NV}A_{NIMU}=A_{NEEF}^{NV}+R_{NEEF}^{NV}(S(\dot{\Omega}_{NEEF})+S \\ (\Omega_{NEEF})S(\Omega_{NEEF}))X_{NIMU}^{EEF} \quad \text{(Equation 22)}$$

where $A_{EEF}^{NV}=A_{NEEF}^{NV}$ by assumption.

Equation 22 is simplified to generate a further EACC equation (e.g., Equation 28 below) based on the assumption. A relative yaw articulation angle of the NEEF and the EEF in the global frame indicative of an EEF and NEEF yaw angle difference $T_{z,EEFnNEEF}$ may be solved for based on the further EACC equation, and the yaw articulation angle of the NEEF relative to the EEF $T_{z,NEEF}^{EEF}$ may be solved for based on the further EACC equation and the relative yaw articulation angle of the NEEF and the EEF in the global frame indicative of an EEF and NEEF yaw angle difference $T_{z,EEFnNEEF}$.

Rewriting Equation 22 results in Equation 23 below.

$$A_{EIMU}-(S(\dot{\Omega}_{EEF})+S(\Omega_{EEF})S(\Omega_{EEF})) \\ X_{EIMU}^{EEF}=R_{NEEF}^{EEF}(A_{NIMU}-(S(\dot{\Omega}_{NEEF})S \\ (\Omega_{NEEF})S(\Omega_{NEEF}))X_{NIMU}^{NEEF}) \quad \text{(Equation 23)}$$

Equation 23 holds, where Equation 24 is set forth, which includes an unknown parameter of the relative yaw articulation angle of the NEEF and the EEF in the global frame indicative of an EEF and NEEF yaw angle difference $T_{z,EEFnNEEF}$:

$$R_{NEEF}^{EEF} = R_{yx,EEF}^{T} R_z(T_{z,EEFnNEEF}) R_{yx,NEEF} \quad \text{(Equation 24)}$$

The EEF and NEEF yaw angle difference $T_{z,EEFnNEEF}$ may be solved from Equations 23-24, as combining Equations 23-24 results in Equation 25-28 below.

$$R_z(T_{z,EEFnNEEF}) \quad \text{(Equation 25)}$$

$$\underbrace{\frac{R_{yx,NEEF}(A_{NIMU} - (S(\dot{\Omega}_{NEEF}) + S(\Omega_{NEEF})S(\Omega_{NEEF}))X_{NIMU}^{NEEF})}{X=(x_1,x_2,x_3)^T}}$$

$$= \underbrace{\frac{R_{yx,EEF} A_{EIMU} - (S(\dot{\Omega}_{EEF}) + S(\Omega_{EEF})S(\Omega_{EEF}))}{Y=(y_1,y_2,y_3)^T}}$$

$$\begin{pmatrix} \cos(T_{z,EEFnNEEF}) & -\sin(T_{z,EEFnNEEF}) & 0 \\ \sin(T_{z,EEFnNEEF}) & \cos(T_{z,EEFnNEEF}) & 0 \\ 0 & 0 & 1 \end{pmatrix} \begin{pmatrix} x_1 \\ x_2 \\ x_3 \end{pmatrix} = \begin{pmatrix} y_1 \\ y_2 \\ y_3 \end{pmatrix} \quad \text{(Equation 26)}$$

$$\underbrace{\begin{pmatrix} -x_2 & x_1 \\ x_1 & x_2 \end{pmatrix}}_{A} \underbrace{\begin{pmatrix} \sin(T_{z,EEFnNEEF}) \\ \cos(T_{z,EEFnNEEF}) \end{pmatrix}}_{U} = \underbrace{\begin{pmatrix} y_1 \\ y_2 \end{pmatrix}}_{V}, x_3 = y_3 \quad \text{(Equation 27)}$$

$$U = \begin{pmatrix} u_1 \\ u_2 \end{pmatrix} = A^{-1}V, T_{z,EEFnNEEF} = \arctan\left(\frac{u_1}{u_2}\right) \quad \text{(Equation 28)}$$

Equation 26 holds if the below is true:
1. $x_3 = y_3$
2. $x_1^2 + x_2^2 \neq 0$
3. $u_2 \neq 0$ Given EEF and NEEF yaw angle difference $T_{z,EEFnNEEF}$ from Equation 28, one can solve for Equation 29 (similar to Equation 20) below.

$$R_{NEEF}^{EEF} R_{yx,EEF}^{T} R_z(T_{z,EEFnNEEF}) R_{yx,NEEF} \quad \text{(Equation 29)}$$

Thus, the relative pitch, roll and yaw angle between EEF and NEEF including the yaw articulation angle of the NEEF relative to the EEF $T_{z,NEEF}^{EEF}$ could be found from $R_{NEEF}^{EEF}$ in Equation 29 (similar to Equation 20) by Equation 30 (similar to Equation 21) below.

$$R_{NEEF}^{EEF} = R_z(T_{z,NEEF}^{EEF}) R_y(T_{y,NEEF}^{EEF}) R_x (T_{x,NEEF}^{EEF}) \quad \text{(Equation 30)}$$

In block 306, the at least two different estimation methods may be fused (e.g., via flagging and fusion of yaw articulation angle estimations of the respective methods) to generate an updated yaw articulation angle as the artic update 222. Such fusion may occur through a fusion algorithm, which may be applied for fusion to occur through a filter such as, but not limited to, a Kalman filter. As a non-limiting example, the at least two different estimation methods may include any two of the GACC method 212, the GYRO method 214, and the EACC method 216 as described above. Further, a yaw articulation rate as artic rate 224 may be calculated based on the received roll and pitch input 202. The artic rate 224 may be calculated in the calculation module 218 of the estimator module 205 of FIG. 4 based on processes as understood to those of ordinary skill in the art upon receipt of the inputs 202.

In block 308, the updated yaw articulation angle as the artic update 222 and the yaw articulation rate as the artic update 224 may be integrated as an integration in the integration module 207 of FIG. 4 to determine a real-time yaw articulate angle estimate as the article RT estimate 210 of the NEEF relative to the EEF. Thus, the real-time yaw articulation angle estimate of the NEEF relative to the EEF as the artic RT estimate 210 may be generated based on the integration. The earthmoving machine may be operated based on the real-time yaw articulation angle estimate generated as the artic RT estimate 210 in FIG. 4.

It is contemplated that the embodiments of the present disclosure may assist to permit a speedy and more cost efficient method of determining values to aid in operation of an earthmoving machine based on such determined values, in a manner that minimizes a risk of human error with such value determinations. Further, the controller of the weight loader or other control technologies are improved such that the processing systems are improved and optimized with respect to speed, efficiency, and output.

A signal may be "generated" by direct or indirect calculation or measurement, with or without the aid of a sensor.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

For the purposes of describing and defining the present disclosure it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A yaw estimation system comprising an earthmoving machine, wherein:
   the earthmoving machine comprises a machine chassis comprising an engine end frame (EEF), an EEF inertial motion unit (IMU), a linkage assembly comprising a non-engine end frame (NEEF), a NEEF IMU, a revolute joint, an earthmoving implement, and control architecture;
   the EEF IMU disposed on the EEF, the NEEF IMU disposed on the NEEF, and the EEF coupled to the NEEF via the revolute joint comprising a yaw axis longitudinally to allow for movement about the yaw axis in a single degree of freedom; and
   the control architecture comprises an architecture controller programmed to:
      receive roll and pitch input from the EEF IMU and from the NEEF IMU;
      estimate a yaw articulation angle of the NEEF relative to the EEF by at least two different estimation methods based on the received roll and pitch input;
      fuse the at least two different estimation methods to generate an updated yaw articulation angle;
      calculate a yaw articulation rate based on the received roll and pitch input;
      integrate as an integration the updated yaw articulation angle and the yaw articulation rate;
      generate a real-time yaw articulation angle estimate of the NEEF relative to the EEF based on the integration; and
      operate the earthmoving machine based on the real-time yaw articulation angle estimate.

2. The yaw estimation system as claimed in claim 1, wherein the architecture controller is programmed to:
   input the received roll and pitch input into a low pass filter (LPF) as an LPF filter input; and
   estimate an LPF phase lag based on the LPF input.

3. The yaw estimation system as claimed in claim 2, wherein the architecture controller is programmed to:
   calculate a dynamic compensation due to the LPF phase lag; and
   integrate as the integration the updated yaw articulation angle, the yaw articulation rate, and the dynamic compensation.

4. The yaw estimation system as claimed in claim 1, wherein the architecture controller is programmed to:
   calculate dead reckoning data for the earthmoving machine; and
   integrate as the integration the updated yaw articulation angle, the yaw articulation rate, and the dead reckoning data.

5. The yaw estimation system as claimed in claim 1, wherein the at least two different estimation methods comprise at least two of three different estimation methods comprising:

(1) a gravitational acceleration (GACC) method using roll and pitch physics, wherein the GACC method uses data associated with the earthmoving machine when on a slope and static to determine a gravitational acceleration relationship between the EEF and the NEEF;

(2) a gyroscope (GYRO) method using angular rate physics, wherein the GYRO method uses the received roll and pitch data associated with the earthmoving machine to determine an angular relationship between the EEF and the NEEF; and (3) an external acceleration (EACC) method using external and linear acceleration physics associated with at least speeding, curving, or combinations thereof of the earthmoving machine to determine an external linear acceleration relationship between the EEF IMU and the NEEF IMU.

6. The yaw estimation system as claimed in claim 5, wherein to execute the GACC method the architecture controller is configured to:
   equate in a GACC equation a rotational matrix of the NEEF relative to a global frame to a rotational matrix of the EEF relative to the global frame multiplied by a rotational matrix of the NEEF relative to the EEF; and
   manipulate the GACC equation based on unknown parameters comprising a yaw articulation angle of the NEEF relative to the global frame, a yaw articulation angle of the EEF relative to the global frame, and a rotational matrix around the yaw axis of the NEEF relative to the EEF to result a further GACC equation listing the yaw articulation angle of the NEEF relative to the EEF as an unknown parameter, wherein rotation matrices associated with a pitch articulation angle and a roll articulation angle based on the received roll and pitch input about each of the yaw axis, a pitch axis, and a roll axis are input parameters; and
   solve for the yaw articulation angle of the NEEF relative to the EEF based on the further GACC equation.

7. The yaw estimation system as claimed in claim 5, wherein to execute the GYRO method the architecture controller is configured to:
   equate in a GACC equation a rotational matrix of the NEEF relative to a global frame to a rotational matrix of the EEF relative to the global frame multiplied by a rotational matrix of the NEEF relative to the EEF;
   generate a time derivative of the GACC equation using associated angular rate vectors in corresponding frames for each parameter;
   simplify to generate a further GYRO equation to solve for an unknown parameters of (i) a relative yaw articulation angle of the NEEF and the EEF in the global frame indicative of an EEF and NEEF yaw angle difference and (ii) a relative yaw rate between the NEEF and the EEF;
   solve for the yaw articulation angle of the NEEF relative to the EEF based on the further GYRO equation.

8. The yaw estimation system as claimed in claim 5, wherein to execute the EACC method the architecture controller is configured to:
   equate in an EACC equation a rotational matrix of the EEF in a global frame multiplied by an EEF IMU original linear acceleration to the EEF original linear acceleration in the global frame plus the rotational matrix of the EEF in the global frame multiplied against associated skewed symmetric matrices of an NEEF angular rate vector in an NEEF frame and a time derivative thereof, and against an NEEF IMU position vector in the NEEF frame;

assume via an assumption that the EEF original acceleration in the global frame equals the NEEF original acceleration in the global frame;
simplify to generate a further EACC equation based on the assumption;
solve for a relative yaw articulation angle of the NEEF and the EEF in the global frame indicative of an EEF and NEEF yaw angle difference based on the further EACC equation;
solve for the yaw articulation angle of the NEEF relative to the EEF based on the further EACC equation and the relative yaw articulation angle of the NEEF and the EEF in the global frame indicative of an EEF and NEEF yaw angle difference.

9. The yaw estimation system as claimed in claim 1, wherein the EEF IMU and the NEEF IMU each comprise a 3-axis accelerometer and a 3-axis gyroscope.

10. The yaw estimation system as claimed in claim 1, wherein the architecture controller is programmed to:
calibrate the EEF IMU, wherein a frame of the EEF includes an EEF frame origin point corresponding to a point on the revolute joint;
calibrate the NEEF IMU, wherein a frame of the NEEF includes an NEEF frame origin point corresponding to the point on the revolute joint.

11. The yaw estimation system as claimed in claim 10, wherein the architecture controller is programmed to:
align a frame of the calibrated EEF IMU with an orientation of the frame of the EEF; and
align a frame of the calibrated NEEF IMU with an orientation of the frame of the NEEF.

12. The yaw estimation system as claimed in claim 1, wherein the architecture controller is programmed to:
remove gravitational acceleration from data received from one or more IMUs of the earthmoving machine, including the EEF IMU and the NEEF IMU.

13. A yaw estimation system comprising an earthmoving machine, wherein:
the earthmoving machine comprises a machine chassis comprising an engine end frame (EEF), an EEF inertial motion unit (IMU), a linkage assembly comprising a non-engine end frame (NEEF), a NEEF IMU, one or more other IMUs, a revolute joint, an earthmoving implement, and control architecture;
the EEF IMU disposed on the EEF, the NEEF IMU disposed on the NEEF, the EEF IMU and the NEEF IMU each comprising a 3-axis accelerometer and a 3-axis gyroscope, and the EEF coupled to the NEEF via the revolute joint comprising a yaw axis longitudinally to allow for movement about the yaw axis in a single degree of freedom; and
the control architecture comprises an architecture controller programmed to:
remove gravitational acceleration from data received from the EEF IMU, the NEEF IMU, and the one or more other IMUs of the earthmoving machine;
receive roll and pitch input from the EEF IMU and from the NEEF IMU;
estimate a yaw articulation angle of the NEEF relative to the EEF by at least two different estimation methods based on the received roll and pitch input;
fuse the at least two different estimation methods to generate an updated yaw articulation angle;
calculate a yaw articulation rate based on the received roll and pitch input;
integrate as an integration the updated yaw articulation angle and the yaw articulation rate;
generate a real-time yaw articulation angle estimate of the NEEF relative to the EEF based on the integration; and
operate the earthmoving machine based on the real-time yaw articulation angle estimate.

14. The yaw estimation system as claimed in claim 13, wherein the architecture controller is programmed to:
calculate dead reckoning data for the earthmoving machine; and
integrate as the integration the updated yaw articulation angle, the yaw articulation rate, and the dead reckoning data.

15. The yaw estimation system as claimed in claim 13, wherein the at least two different estimation methods comprise at least two of three different estimation methods comprising:
(1) a gravitational acceleration (GACC) method using roll and pitch physics, wherein the GACC method uses data associated with the earthmoving machine when on a slope and static to determine a gravitational acceleration relationship between the EEF and the NEEF;
(2) a gyroscope (GYRO) method using angular rate physics, wherein the GYRO method uses the received roll and pitch data associated with the earthmoving machine to determine an angular relationship between the EEF and the NEEF; and
(3) an external acceleration (EACC) method using external and linear acceleration physics associated with at least speeding, curving, or combinations thereof of the earthmoving machine to determine an external linear acceleration relationship between the EEF IMU and the NEEF IMU.

16. The yaw estimation system as claimed in claim 15, wherein to execute the GACC method the architecture controller is configured to:
equate in a GACC equation a rotational matrix of the NEEF relative to a global frame to a rotational matrix of the EEF relative to the global frame multiplied by a rotational matrix of the NEEF relative to the EEF; and
manipulate the GACC equation based on unknown parameters comprising a yaw articulation angle of the NEEF relative to the global frame, a yaw articulation angle of the EEF relative to the global frame, and a rotational matrix around the yaw axis of the NEEF relative to the EEF to result a further GACC equation listing the yaw articulation angle of the NEEF relative to the EEF as an unknown parameter, wherein rotation matrices associated with a pitch articulation angle and a roll articulation angle based on the received roll and pitch input about each of the yaw axis, a pitch axis, and a roll axis are input parameters; and
solve for the yaw articulation angle of the NEEF relative to the EEF based on the further GACC equation.

17. The yaw estimation system as claimed in claim 15, wherein to execute the GYRO method the architecture controller is configured to:
equate in a GACC equation a rotational matrix of the NEEF relative to a global frame to a rotational matrix of the EEF relative to the global frame multiplied by a rotational matrix of the NEEF relative to the EEF;
generate a time derivative of the GACC equation using associated angular rate vectors in corresponding frames for each parameter;
simplify to generate a further GYRO equation to solve for an unknown parameters of (i) a relative yaw articulation angle of the NEEF and the EEF in the global frame indicative of an EEF and NEEF yaw angle difference and (ii) a relative yaw rate between the NEEF and the EEF;

solve for the yaw articulation angle of the NEEF relative to the EEF based on the further GYRO equation.

18. The yaw estimation system as claimed in claim 15, wherein to execute the EACC method the architecture controller is configured to:

equate in an EACC equation a rotational matrix of the EEF in a global frame multiplied by an EEF IMU original linear acceleration to the EEF original linear acceleration in the global frame plus the rotational matrix of the EEF in the global frame multiplied against associated skewed symmetric matrices of an NEEF angular rate vector in an NEEF frame and a time derivative thereof, and against an NEEF IMU position vector in the NEEF frame;

assume via an assumption that the EEF original acceleration in the global frame equals the NEEF original acceleration in the global frame;

simplify to generate a further EACC equation based on the assumption;

solve for a relative yaw articulation angle of the NEEF and the EEF in the global frame indicative of an EEF and NEEF yaw angle difference based on the further EACC equation;

solve for the yaw articulation angle of the NEEF relative to the EEF based on the further EACC equation and the relative yaw articulation angle of the NEEF and the EEF in the global frame indicative of an EEF and NEEF yaw angle difference.

19. A method for use of yaw estimation system comprising an earthmoving machine, wherein the earthmoving machine comprises a machine chassis comprising an engine end frame (EEF), an EEF inertial motion unit (IMU), a linkage assembly comprising a non-engine end frame (NEEF), a NEEF IMU, a revolute joint, an earthmoving implement, and control architecture, and wherein the EEF IMU is disposed on the EEF, the NEEF IMU is disposed on the NEEF, and the EEF is coupled to the NEEF via the revolute joint comprising a yaw axis longitudinally to allow for movement about the yaw axis in a single degree of freedom, the method comprising:

receiving roll and pitch input from the EEF IMU and from the NEEF IMU;

estimating via an architecture controller of the control architecture a yaw articulation angle of the NEEF relative to the EEF by at least two different estimation methods based on the received roll and pitch input;

fusing the at least two different estimation methods to generate an updated yaw articulation angle;

calculating a yaw articulation rate based on the received roll and pitch input;

integrating as an integration the updated yaw articulation angle and the yaw articulation rate;

generating via the architecture controller a real-time yaw articulation angle estimate of the NEEF relative to the EEF based on the integration; and operating via the control architecture the earthmoving machine based on the real-time yaw articulation angle estimate.

20. The method as claimed in claim 19, wherein the at least two different estimation methods comprise at least two of three different estimation methods comprising:

(1) a gravitational acceleration (GACC) method using roll and pitch physics, wherein the GACC method uses data associated with the earthmoving machine when on a slope and static to determine a gravitational acceleration relationship between the EEF and the NEEF;

(2) a gyroscope (GYRO) method using angular rate physics, wherein the GYRO method uses the received roll and pitch data associated with the earthmoving machine to determine an angular relationship between the EEF and the NEEF; and (3) an external acceleration (EACC) method using external and linear acceleration physics associated with at least speeding, curving, or combinations thereof of the earthmoving machine to determine an external linear acceleration relationship between the EEF IMU and the NEEF IMU.

* * * * *